Figure 1:
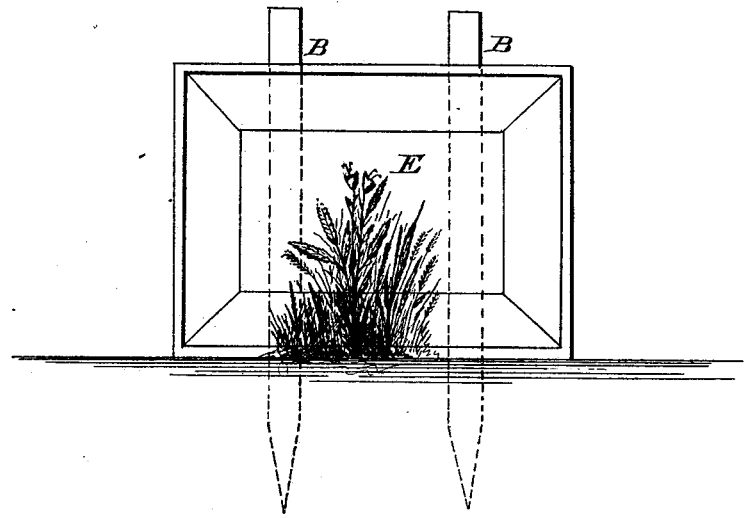
Figure 2:
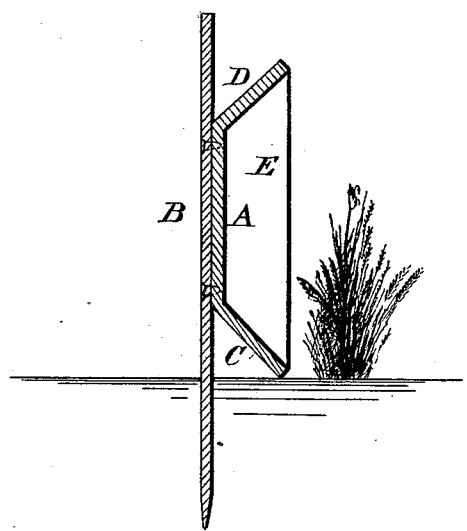

A. PUDIGON.
REFLECTOR AND PLANT PROTECTOR.

No. 189,653.  Patented April 17, 1877.

WITNESSES
Franck L. Durand
Henry N. Miller

INVENTOR
A. Pudigon
By T. H. Alexander
Attorneys

UNITED STATES PATENT OFFICE.

AUGUST PUDIGON, OF CHARLESTON, SOUTH CAROLINA.

IMPROVEMENT IN REFLECTOR AND PLANT-PROTECTOR.

Specification forming part of Letters Patent No. 189,653, dated April 17, 1877; application filed May 18, 1876.

*To all whom it may concern:*

Be it known that I, AUGUST PUDIGON, of Charleston, in the county of Charleston and State of South Carolina, have invented certain new and useful Improvements in Reflector and Plant-Protector; and do hereby declare that the following is a full, clear, and exact description thereof, reference being had to the accompanying drawings, and to the letters of reference marked thereon, which form part of this specification.

The nature of my invention consists in the construction and arrangement of a reflector and protector for plants, as will be hereinafter more fully set forth.

The accompanying drawing fully illustrates my invention.

A represents a board, of any suitable dimensions, attached to one or more stakes, B, which are to be inserted in the ground, either upright or at any angle desired. Along the bottom edge of the board A is another board, C, projecting downward and forward at an angle of about forty-five degrees. Another board, D, is along the upper edge, extending upward and forward in the same manner. The ends are then closed by boards E E at the same angle. The inner side of the protector constructed of that form, of wood or any other suitable material, is to be painted white, while the outer side thereof is painted black.

This device is intended, principally, to be used for forcing early fruit and vegetables— such as strawberries, cucumbers, melons, &c. It is to be placed generally on the north side of the plant, so that the rays of the sun are arrested by the white face and sent back by reflection upon the plants in front, thereby increasing the heating-power in early spring, and at the same time protecting the plants from the cold north winds. It may be made of any size, to be used for one or more plants.

When frost is expected the reflector is turned over upon the plants, protecting them from white frost, or such frost as usually occurs in the south at the planting season.

I do not, broadly, claim a plant-protector having a reflecting-surface, as I am aware that such is not new.

Having thus fully described my invention, what I claim as new, and desire to secure by Letters Patent, is—

The within-described reflector and protector for plants, formed of wood, and consisting of the part A, secured to one or more stakes, B, and provided with the flaring sides C D E, and painted white on the front, substantially as and for the purposes herein set forth.

In testimony that I claim the foregoing as my own I affix my signature in presence of two witnesses.

AUGUST PUDIGON.

Witnesses:
J. G. WHILDEN,
H. W. MITCHELL.